US012626319B1

(12) United States Patent
Williams et al.

(10) Patent No.: US 12,626,319 B1
(45) Date of Patent: May 12, 2026

(54) SYSTEMS AND METHODS FOR EVALUATING CAREER INTERESTS THROUGH SITUATION JUDGMENT TEST FORMAT

(71) Applicant: Educational Testing Service, Princeton, NJ (US)

(72) Inventors: Kevin M. Williams, Exton, PA (US); Devon M. Kinsey, Penndel, PA (US); Patrick C. Kyllonen, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 196 days.

(21) Appl. No.: 18/509,409

(22) Filed: Nov. 15, 2023

Related U.S. Application Data

(60) Provisional application No. 63/425,727, filed on Nov. 16, 2022.

(51) Int. Cl.
G06Q 50/20 (2012.01)
G06F 40/40 (2020.01)
G09B 7/02 (2006.01)

(52) U.S. Cl.
CPC ......... G06Q 50/2057 (2013.01); G06F 40/40 (2020.01); G09B 7/02 (2013.01)

(58) Field of Classification Search
CPC ........................... G06Q 50/2057; G06F 40/40
See application file for complete search history.

(56) References Cited

U.S. PATENT DOCUMENTS

| | | | | |
|---|---|---|---|---|
| 9,767,525 | B2 * | 9/2017 | Geritz | G06Q 50/205 |
| 2010/0028846 | A1 * | 2/2010 | Cohen | G06Q 10/06398 434/323 |
| 2015/0332600 | A1 * | 11/2015 | Aggarwal | G09B 7/06 434/353 |
| 2017/0025029 | A1 * | 1/2017 | Aggarwal | G09B 7/00 |
| 2022/0101265 | A1 * | 3/2022 | Pande | G06Q 10/06 |

(Continued)

OTHER PUBLICATIONS

B. Harsha, N. Sravanthi, N. Sankeerthana and M. Suneetha, "Career Choice Using Machine Learning Algorithms," 2022 International Conference on Inventive Computation Technologies (ICICT), Nepal, 2022, pp. 171-176, doi: 10.1109/ ICICT54344.2022.9850697. (Year: 2022).*

(Continued)

*Primary Examiner* — George Chen
*Assistant Examiner* — Tayar M Kyu
(74) *Attorney, Agent, or Firm* — Jones Day

(57) ABSTRACT

Systems and methods are provided for evaluating career interests through situational judgment test format. In embodiments, a career assessment is generated, using a first language based machine learning model and a set of criteria. The career assessment is administered to a user. A plurality of test answers for the user are received based on the career assessment. For a particular test answer a score is assigned for the particular test answer and at least one user career interest category based on the score is determined. The totals for the at least one user career interest category based on the determining is tabulated. At least one career suggestion is provided, using a second language based machine learning model, based on the totals for the at least one user career interest category.

25 Claims, 18 Drawing Sheets

(56) References Cited

U.S. PATENT DOCUMENTS

| | | | | |
|---|---|---|---|---|
| 2022/0138881 A1* | 5/2022 | Sabatini | ............ | G06Q 50/2057 |
| | | | | 705/328 |
| 2022/0230143 A1* | 7/2022 | Murugaiah | ...... | G06Q 10/06311 |

OTHER PUBLICATIONS

Brower, Cheyna Katherine; Too Long and Too Boring: The Effects of Survey Length and Interest on Careless Responding; Dissertation, Wright State University; 2018.

Christian, Michael, Edwards, Bryan, Bradley, Jill; Situational Judgment Tests: Constructs Assessed and a Meta-Analysis of Their Criterion-Related Validities; Personnel Psychology, 63(1); pp. 83-117; 2010.

Cohen, Jacob; Statistical Power Analysis for the Behavioral Sciences, 2nd Ed.; Lawrence Erlbaum Associates; 1988.

Educational Testing Service; How ETS Works to Improve Test Accessibility; http://www.ets.org/pdfs/about/improve-accessibility.pdf.

Gibson, Donald; Role Models in Career Development: New Directions for Theory and Research; Journal of Vocational Behavior, 65(1); pp. 134-156; Aug. 2004.

Gnambs, Timo; A Meta-Analysis of Dependability Coefficients (Test-Retest Reliabilities) for Measures of the Big Five; Journal of Research Personality, 52; pp. 20-28; Oct. 2014.

Harmon, et al.; Strong Interest Inventory: Applications and Technical Guide; Consulting Psychologists Press: Palo, Alto, CA; 1994.

Hoff, et al.; Normative Changes in Interests from Adolescence to Adulthood: A Meta-Analysis of Longitudinal Studies; Psychological Bulletin, 144(4); pp. 426-451; 2018.

Hoff, et al.; Interest Fit and Job Satisfaction: A Systemic Review and Meta-Analysis; Journal of Vocational Behavior, 123; Article 103503; 2020.

Holland, John; Making Vocational Choices: A Theory of Vocational Personalities and Work Environments; Psychological Assessment Resources: Odessa, FL; 1985.

Kell, Harrison, Roohr, Katrina, Fishtein, Daniel; Who's Who in CTE Occupations: Documenting the Demographic Composition of CTE Job Holders; ETS: Career and Technical Education Series Research Notes; 2020.

Low, et al.; The Stability of Vocational Interests from Early Adolescence to Middle Adulthood: A Quantitative Review of Longitudinal Studies; Psychological Bulletin, 131(5); pp. 713-737; Sep. 2005.

Maniaci, Michael, Rogge, Ronald; Caring About Carelessness: Participant Inattention and Its Effects on Research; Journal of Research in Personality, 48; pp. 61-83; Feb. 2014.

McDaniel, et al.; Use of Situational Judgment Tests to Predict Job Performance: A Clarification of the Literature; Journal of Applied Psychology, 86(4); pp. 730-740; Aug. 2001.

Nichols, Austin Lee, Edlund, John E.; Why Don't We Care More About Carelessness? Understanding the Causes and Consequences of Careless Participants; International Journal of Social Research Methodology: Theory and Practice, 23(6); pp. 625-638; 2020.

Rounds, et al.; O*NET Interest Profiler Manual; U.S. Department of Labor, The National Center for O*NET Development, Raleigh, NC; 2021.

Tennessee Department of Education; Approved Career Aptitude Assessments for TCA 49-6-412; https://www.tn.gov/content/dam/tn/education/ccte/PC108CriteriaApprovedListMatrix_Final_Published.pdf; 2022.

Tracey, T.J., Sodano, S.M.; Issues of Stability and Change in Interest Development; The Career Development Quarterly, 57(1); pp. 51-62; 2008.

Van Iddekinge, et al.; Are You Interested? A Meta-Analysis of Relations Between Vocational Interests and Employee Performance Turnover; Journal of Applied Psychology, 96(6); pp. 1167-1194; 2011.

Weekley, J.A., Ployhart, R.E.; An Introduction to Situational Judgment Testing; in Situational Judgment Tests: Theory, Measurement, and Application; Erlbaum: Mahwah, NJ; pp. 1-10; 2006.

Wille, Bart, De Fruyt, Filip; Development of Vocational Interests in Adulthood; in Vocational Interests in the Workplace: Rethinking Behavior at Work; Routledge: New York, NY; pp. 251-279; 2019.

* cited by examiner

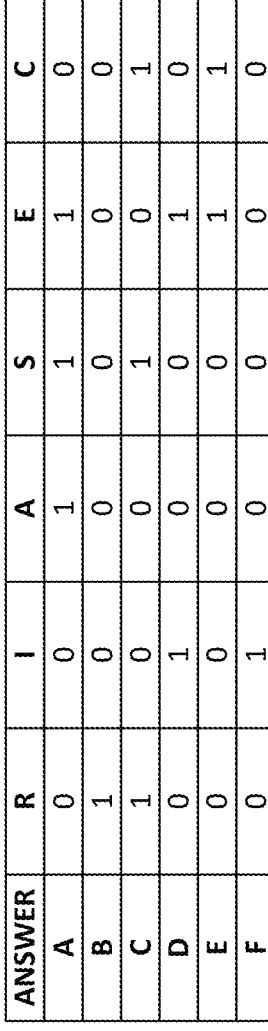
| ANSWER | R | I | A | S | E | C |
|--------|---|---|---|---|---|---|
| A | 0 | 0 | 1 | 1 | 1 | 0 |
| B | 1 | 0 | 0 | 0 | 0 | 0 |
| C | 1 | 0 | 0 | 1 | 0 | 1 |
| D | 0 | 1 | 0 | 0 | 1 | 0 |
| E | 0 | 0 | 0 | 0 | 1 | 1 |
| F | 0 | 1 | 0 | 0 | 0 | 0 |
500
FIG. 5

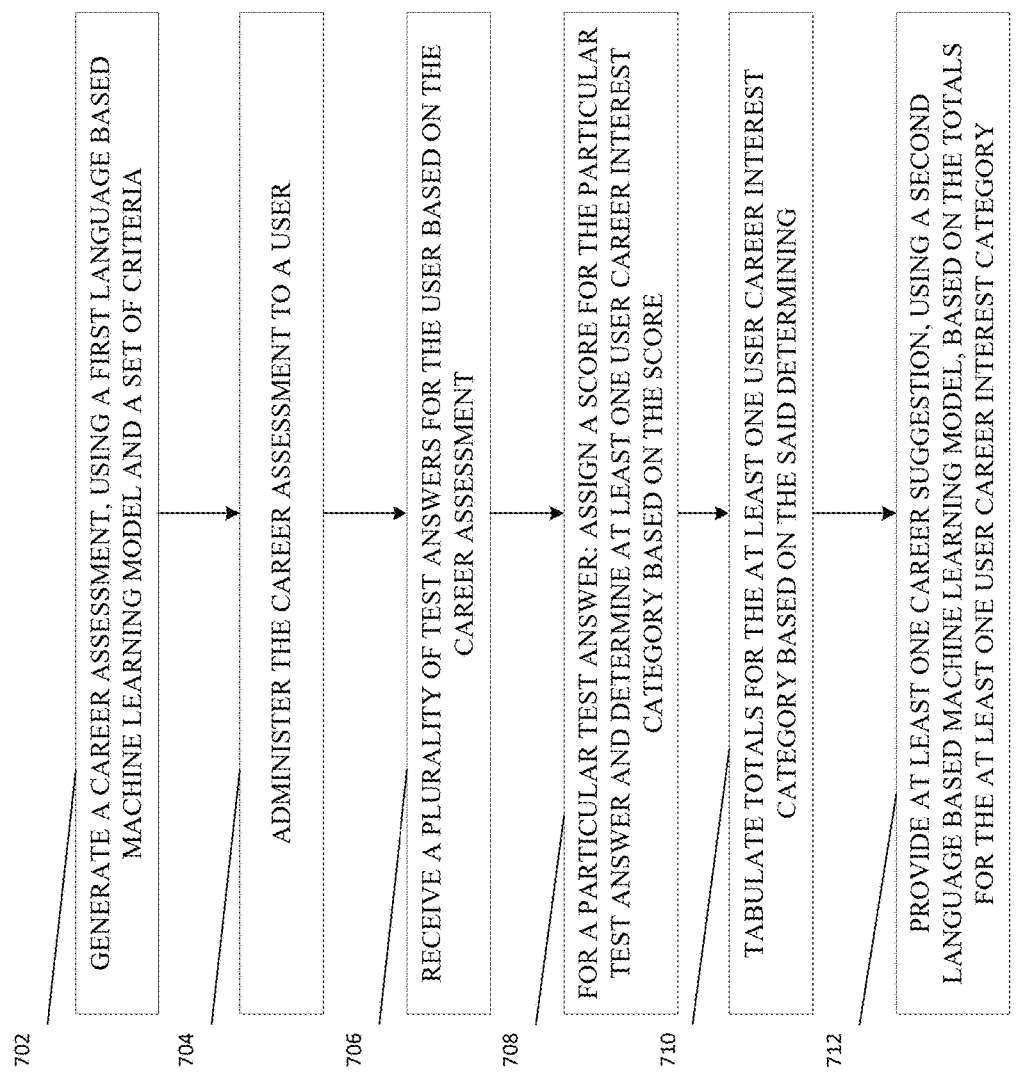

700

702 GENERATE A CAREER ASSESSMENT, USING A FIRST LANGUAGE BASED MACHINE LEARNING MODEL AND A SET OF CRITERIA

704 ADMINISTER THE CAREER ASSESSMENT TO A USER

706 RECEIVE A PLURALITY OF TEST ANSWERS FOR THE USER BASED ON THE CAREER ASSESSMENT

708 FOR A PARTICULAR TEST ANSWER: ASSIGN A SCORE FOR THE PARTICULAR TEST ANSWER AND DETERMINE AT LEAST ONE USER CAREER INTEREST CATEGORY BASED ON THE SCORE

710 TABULATE TOTALS FOR THE AT LEAST ONE USER CAREER INTEREST CATEGORY BASED ON THE SAID DETERMINING

712 PROVIDE AT LEAST ONE CAREER SUGGESTION, USING A SECOND LANGUAGE BASED MACHINE LEARNING MODEL, BASED ON THE TOTALS FOR THE AT LEAST ONE USER CAREER INTEREST CATEGORY

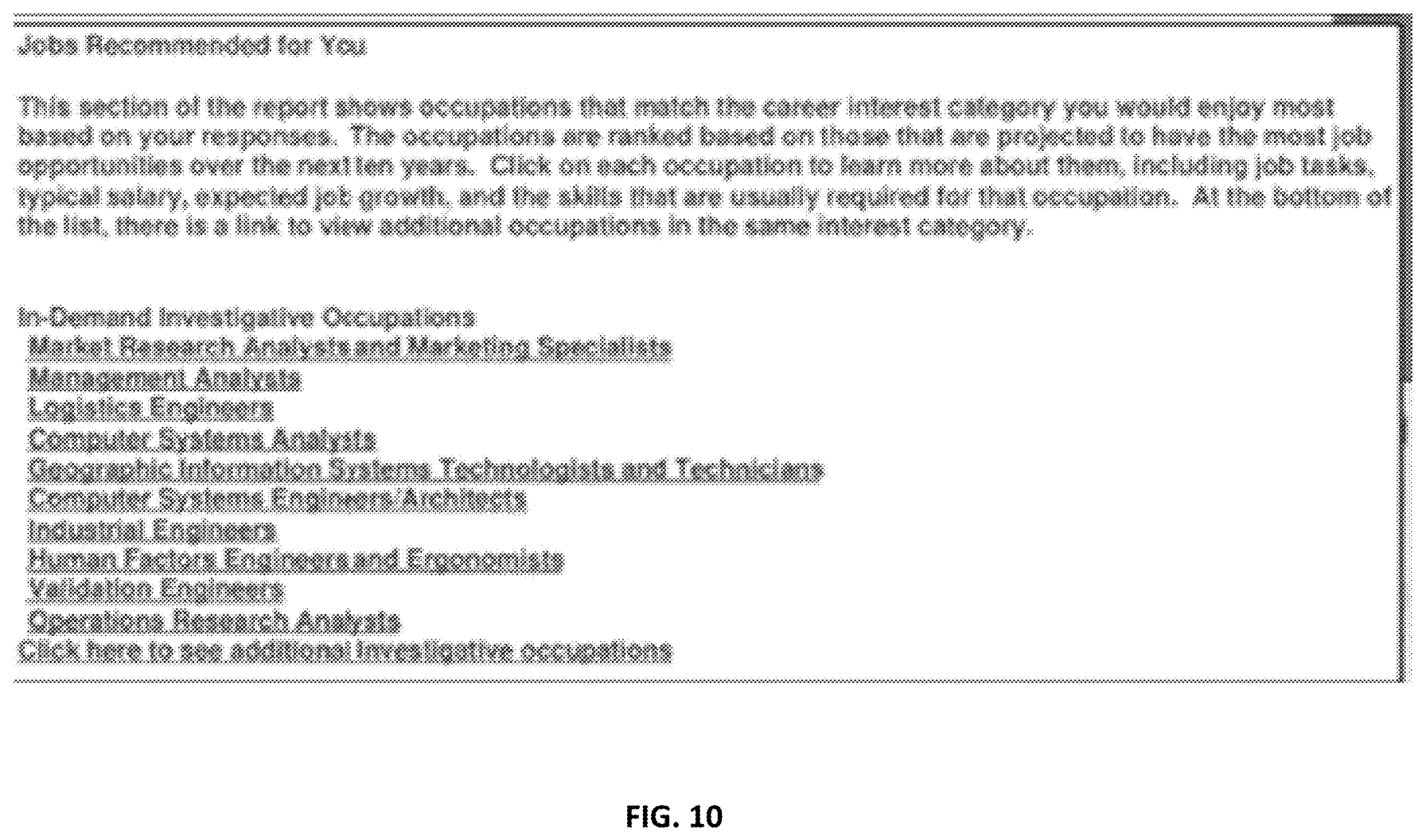

Jobs Recommended for You

This section of the report shows occupations that match the career interest category you would enjoy most based on your responses. The occupations are ranked based on those that are projected to have the most opportunities over the next ten years. Click on each occupation to learn more about them including job tasks, typical salary, expected job growth, and the skills that are usually required for that occupation. At the bottom of the list, there is a link to view additional occupations in the same interest category.

In-Demand Investigative Occupations
- Market Research Analysts and Marketing Specialists
- Management Analysts
- Logistics Engineers
- Computer Systems Analysts
- Information Systems Technologists and Technicians
- Computer Systems Engineers/Architects
- Industrial Engineers
- Human Factors Engineers and Ergonomists
- Validation Engineers
- Operations Research Analysts
- Click here to see additional investigative occupations

FIG. 10

| RIASEC Category | High-Point Score (%) | | Low-Point Score (%) | |
|---|---|---|---|---|
| | Wave 1 | Wave 2 | Wave 1 | Wave 2 |
| Realistic | 13.0 | 12.4 | 9.5 | 11.2 |
| Investigative | 8.0 | 8.3 | 6.0 | 4.1 |
| Artistic | 27.8 | 29.6 | 4.0 | 3.0 |
| Social | 5.5 | 8.3 | 33.5 | 33.7 |
| Enterprising | 8.5 | 7.7 | 13.5 | 11.2 |
| Conventional | 22.0 | 21.9 | 16.5 | 20.7 |
| Multiple High- (or Low-) Points | 15.5 | 11.8 | 17.0 | 16.0 |

Note. Ns = 200 (Wave 1) and 169 (Wave 2).

| | | Group 1 | | Group 2 | | Group 3 | | Group 4 | | Group 5 | |
|---|---|---|---|---|---|---|---|---|---|---|---|
| | | N | % | N | % | N | % | N | % | N | % |
| Wave 1 | High-Point Agreement | 16 | 42.1 | 19 | 57.6 | 19 | 43.2 | 14 | 38.9 | 68 | 45.0 |
| | High-Point Disagreement | 22 | 57.9 | 14 | 42.4 | 25 | 56.8 | 22 | 61.1 | 83 | 55.0 |
| Wave 2 | High-Point Agreement | 18 | 47.4 | 16 | 53.3 | 12 | 31.6 | 16 | 48.5 | 62 | 44.6 |
| | High-Point Disagreement | 20 | 52.6 | 14 | 46.7 | 26 | 68.4 | 17 | 51.5 | 77 | 55.4 |

FIG. 13a

| | | Group 1 | | Group 2 | | Group 3 | | Group 4 | | Group 5 | |
|---|---|---|---|---|---|---|---|---|---|---|---|
| | | N | % | N | % | N | % | N | % | N | % |
| Wave 1 | Low-Point Agreement | 14 | 41.2 | 21 | 53.8 | 15 | 39.5 | 11 | 28.9 | 61 | 40.9 |
| | Low-Point Disagreement | 20 | 58.8 | 18 | 46.2 | 23 | 60.5 | 27 | 71.1 | 88 | 59.1 |
| Wave 2 | Low-Point Agreement | 16 | 43.2 | 18 | 60.0 | 13 | 40.6 | 12 | 54.5 | 59 | 48.8 |
| | Low-Point Disagreement | 21 | 56.8 | 12 | 40.0 | 19 | 59.4 | 10 | 45.5 | 62 | 51.2 |

FIG. 13b

|  | Career Interest SJT | OIP-SF |
|---|---|---|
| Realistic | .77 | .45 |
| Investigative | .60 | .18 |
| Artistic | .83 | .44 |
| Social | .79 | .56 |
| Enterprising | .71 | .39 |
| Conventional | .82 | .54 |

*Note.* $N = 169$.

FIG. 14

Wave 2 Career Interest SJT High-Point

| Wave 1 Career Interest SJT High-Point | R | I | A | S | E | C | Total | % Agreement |
|---|---|---|---|---|---|---|---|---|
| Realistic (R) | 13 | 1 | 4 | 1 | 1 | 1 | 21 | 61.9 |
| Investigative (I) | 1 | 6 | 0 | 0 | 1 | 1 | 11 | 54.5 |
| Artistic (A) | 2 | 0 | 37 | 1 | 1 | 0 | 41 | 90.2 |
| Social (S) | 0 | 0 | 0 | 7 | 1 | 0 | 8 | 87.5 |
| Enterprising (E) | 0 | 0 | 1 | 2 | 6 | 0 | 9 | 66.7 |
| Conventional (C) | 4 | 0 | 1 | 1 | 0 | 28 | 37 | 75.6 |

FIG. 15a

Wave 2 Career Interest SJT Low-Point

| Wave 1 Career Interest SJT Low-Point | R | I | A | S | E | C | Total | % Agreement |
|---|---|---|---|---|---|---|---|---|
| Realistic (R) | 8 | 2 | 0 | 0 | 1 | 4 | 15 | 53.3 |
| Investigative (I) | 0 | 0 | 2 | 0 | 0 | 2 | 5 | 0.0 |
| Artistic (A) | 1 | 0 | 2 | 0 | 0 | 1 | 6 | 33.3 |
| Social (S) | 0 | 0 | 0 | 41 | 7 | 2 | 50 | 82.0 |
| Enterprising (E) | 2 | 1 | 0 | 1 | 4 | 2 | 16 | 25.0 |
| Conventional (C) | 2 | 2 | 0 | 1 | 1 | 18 | 28 | 60.0 |

FIG. 15b

SYSTEMS AND METHODS FOR EVALUATING CAREER INTERESTS THROUGH SITUATION JUDGMENT TEST FORMAT

CROSS-REFERENCE TO RELATED APPLICATIONS

This application claims the benefit of U.S. Provisional Patent Application No. 63/425,727, filed Nov. 16, 2022, which is incorporated by reference herein in its entirety.

TECHNICAL FIELD

The technology described herein relates to evaluating career interests through situational judgment test format.

BACKGROUND

Career assessment can help job seekers glean valuable insights into their specific skills and abilities that may be relevant to different types of careers. Many job seekers lack career interest self-awareness, and a career assessment may provide an informed job search. Situational judgment tests (SJTs) require a test taker to respond to a variety of hypothetical scenarios. SJTs may increase test-taker engagement and decrease careless responding. Career interests can be classified in different ways. One example is using the RIASEC model, which breaks job tasks into six different categories: realistic, investigative, artistic, social, enterprising, and conventional.

SUMMARY

Systems and methods are provided for a computer-implemented method for evaluating career interests through situational judgment test format. An example system performs steps, including generating a career assessment, using a first language based machine learning model and a set of criteria. The example system further administers the career assessment to a user and receives a plurality of test answers for the user based on the career assessment. Then, for a particular test answer in the plurality of test answers, the system assigns a score for the particular test answer and determines at least one user career interest based on the score. The example system tabulates totals for the at least one user career interest category based on the determining step and provides at least one career suggestion, using a second language based machine learning model, based on the totals for the at least one user career interest category.

As another example, a method for evaluating career interests through situational judgment test format is provided. A career assessment is generated, using a first language based machine learning mode and a set of criteria. The career assessment is administered to a user. A plurality of test answers for the user are received based on the career assessment. For a particular test answer in the plurality of test answers, a score is assigned for the particular test answer and at least one user career interest is determined based on the score. Totals for the at least one user career interest category based on the said determining are tabulated. At least one career suggestion is provided, using a second language based machine learning model, based on the totals for the at least one user career interest category.

As a further example, a computer-readable medium is encoded with instructions for commanding one or more data processors to execute a method for evaluating career interests through situational judgment test format. The example method includes generating a career assessment, using a first language based machine learning model and a set of criteria. The example method further administers the career assessment to a user and receives a plurality of test answers for the user based on the career assessment. Then, for a particular test answer in the plurality of test answers, the method assigns a score for the particular test answer and determines at least one user career interest based on the score. The example method tabulates totals for the at least one user career interest category based on the determining step and provides at least one career suggestion, using a second language based machine learning model, based on the totals for the at least one user career interest category.

BRIEF DESCRIPTION OF THE DRAWINGS

FIG. 5 is a diagram depicting example details of a key.

FIG. 7 is a flow diagram depicting an example method for evaluating career interests through situational judgment test format.

FIG. 9 is an example career interest report.

FIG. 10 is another example career interest report.

FIG. 11 is a table depicting example high point and low point scores for a career interest evaluation at two instances at two different timepoints.

FIG. 12*a* is a table depicting an example correlation between a career interest assessment and an OIF-SF assessment at a first instance at a first timepoint.

FIG. 12*b* is a table depicting an example correlation between a career interest assessment and an OIF-SF assessment at a second instance at a second timepoint.

FIG. 13*a-b* are tables evaluating example high-point and low-point agreement between the career interest assessment and OIP-SF assessment.

FIG. 14 is a table depicting the correlation of six career interest category scores between the first and second instances.

FIG. 15*a* is a table depicting correlations between the first and second instance high-point scores.

FIG. 15*b* is a table depicting correlations between the first and second instance low-point scores.

DETAILED DESCRIPTION

Figure 1:
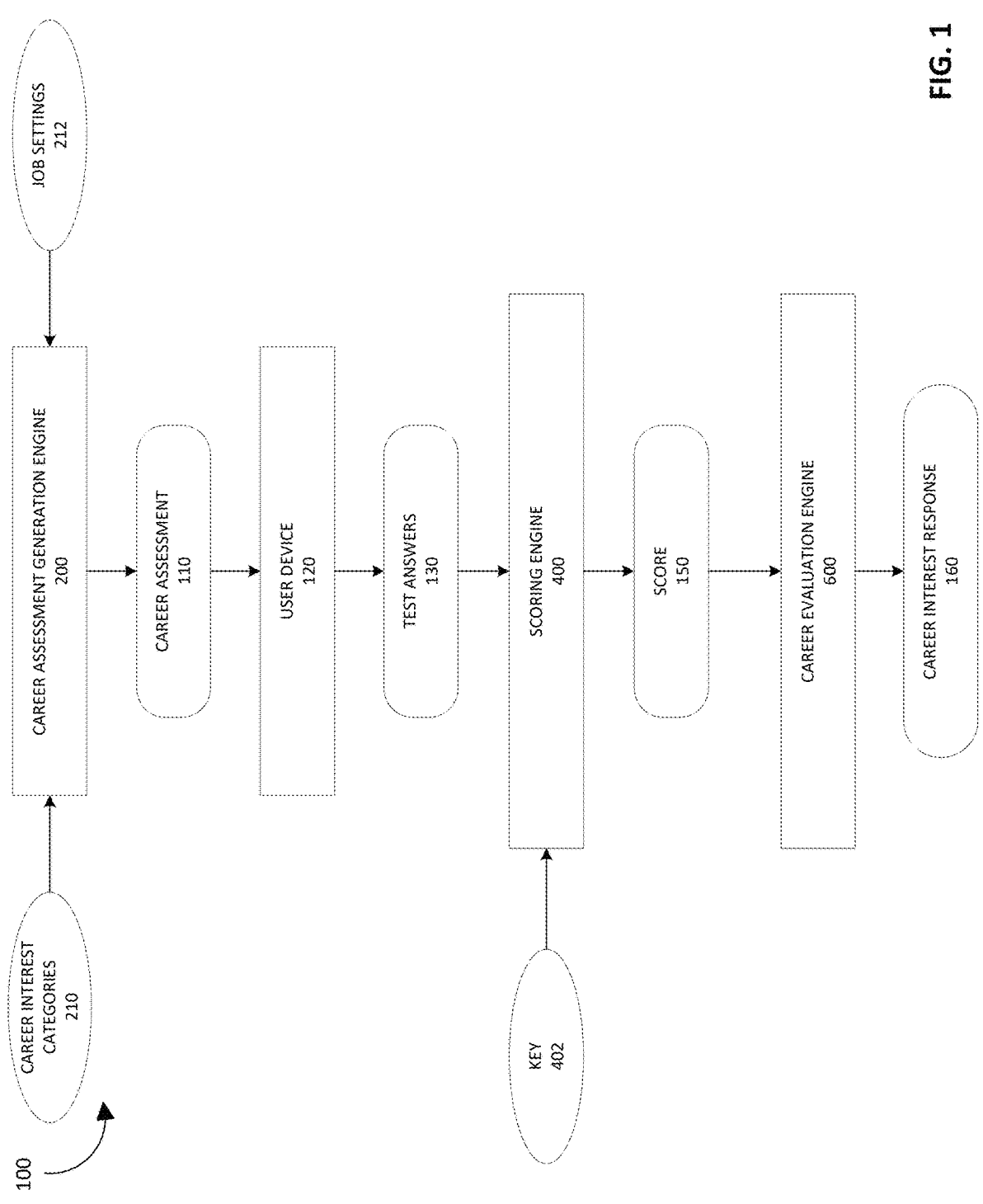
FIG. 1 is a diagram depicting an example system for evaluating career interests through situational judgment test format.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in some various examples. This repetition is for the purpose of simplicity and clarity and does not in itself dictate a relationship between some various embodiments and/or configurations discussed. Moreover, while certain features of the currently disclosed subject matter are described for illustrative purposes in relation to career interest categorizations, such as RIASEC, a framework that characterizes occupations across six dimensions described in further detail below, it should be readily understood that such features are not intended to be limiting.

Identifying occupations that match job seekers' interest is a crucial component of career exploration. In fact, in many U.S. states, career interest assessment is mandate for K-12 students so educators may effectively plan individualized educational pathways. However, career interest assessments are effective in helping individuals of all ages and backgrounds gain insight into potential compatible occupations. Career interests can be categories in many different ways. One example categorization model is the Holland's RIASEC taxonomy. This framework characterizes occupations across six dimensions-realistic, investigative, artistic, social, enterprising, and conventional-based on the types of tasks commonly performed. RIASEC assessments as well as other career interest assessments that currently exist, typically in the form of surveys, may induce low levels of test-taker enjoyment or interest, which can be associated with increased levels of careless responses (e.g., random or pattern responding). This may be a threat to an assessment's psychometric properties. Alternative assessment formats may enhance user engagement, which may improve assessment validity.

Situational judgment tests (SJTs) represent an example assessment format that may improve upon surveys. SJTs differ from traditional assessment formats such as Likert surveys in that test takers are presented with hypothetical, realistic scenarios and asked to choose from a set of possible courses of action. More specifically, SJTs employ forced-choice or rank-order response formats. SJTs may be developed to assess constructs such as leadership, interpersonal skills, personality, and ethical decision making. One benefit of SJTs is that they may demonstrate similar validity coefficients as cognitive ability assessments, and they may display incremental validity over cognitive ability and personality assessments. SJTs may also generate fewer demographic differences than cognitive ability measures, and they may also possess high face validity.

Systems and methods for evaluating career interests through situational judgment test format are described herein in embodiments. Systems and methods herein may utilize SJT assessments to provide a job seeker with career interest categories that align with their interests as well as career suggestions based on the career interest categories. Machine learning models may be used by the systems and methods herein to generate career interest assessments and identify job suggestions. Systems and methods herein may score answers to career interest assessments.

FIG. 1 is a diagram depicting a system embodiment 100 for evaluating career interests through situational judgment test format. A career assessment generation engine 200 generates a career assessment 110. The career assessment generation engine 200 may use a machine-learning model to generate questions based on a career interest category 210 and job settings 212. The career interest category 210 may be a specific career interest categorization, such as the RIASEC model. The career assessment 110 may be in a SJT format and may be composed of one or more questions, in accordance with some embodiments. Each question may be regarding a specific job setting from the job settings 212 (e.g., a hospital, sports reality show, state park, solar farm, natural history museum, etc.) and a set of answer items. Answer items may be job tasks that an individual could perform at the specific job setting (e.g., observe, interview, and assess patients to identify care needs for a hospital setting). In some embodiments, there may be at least one answer item for each career interest in the specific career interest categorization. For example, for the RIASEC model, there may be six answer items, one for each category.

A user device 120 receives the career assessment 110. The user device 120 may be a process-based device including, for example, a smartphone, a tablet, a computer, and/or the like. In some embodiments, the user device 120 may receive the career assessment 110 via a network. The network may be a wired network and/or a wireless network, including, for example, a wide area network (WAN), a local area network (LAN), a virtual local area network (VLAN), a public land mobile network (PLMN), the Internet, and/or the like. The user device 120 may administer the career assessment 110 to a user. In some embodiments, an administer may use the user device to generate physical career interest assessments. The user may respond to the career assessment 110 and generate a set of test answers 130. In some embodiments, the test answers 130 provide the most relevant test answer and the least relevant test answer to a question in the career assessment ("Most/Least answer choice"). For example, one question in an example career assessment may be that the user is working in a hospital setting, where they are able to perform the following three tasks: (1) develop nursing service philosophies, goals, policies, priorities, or procedures; (2) observe, interview, and assess patients to identify care needs; or (3) evaluate the quality and effectiveness of nursing practice or organizational systems. Using the Most/Least answer choice framework, the user may choose a task that they would be most interested in performing in a hospital and a task that they would be least interested in performing. In other embodiments, the test answers 130 provide a ranked list of all the answer items. For example, in the hospital example above, the user would rank all three answer items from most interested to least interested. The test answers 130 would provide answers for all the questions in the career assessment 110.

Referring back to FIG. 1, a scoring engine 400 may receive the test answer 130 from the user device 120. In some embodiments, the test answers 130 may be transmitted via the same or a different network as before. The scoring engine 400 generates a score 150 based on test answers 130 and a key 402. The key 402 may provide a scoring method for each question to the scoring engine 400. In some embodiments, the score 150 may comprise a value for each career interest category. Alternatively and/or additionally, the score 150 may comprise one or more career interest categories identified as relevant to the user based on the test answer 130.

A career evaluation engine 600 receives the score 150 and generates a career interest response 160. In some embodiments, the career evaluation engine 600 may use a machine-learning based model to identify careers related to the score 150. For example, using the RIASEC career interest categorization, if the user's score 150 demonstrates that their career interest is artistic, the career evaluation engine 600 would identify careers with job tasks that relate to the artistic career interest. The career interest response 160 may comprise one or more careers that are related to the user's career interest category and/or score 150. In some embodiments, the career evaluation engine 600 may utilize a database comprising all careers that exist and identify ones that relate to the user's career interest category and/or score 150. Alternatively and/or additionally, in some embodiments the career evaluation engine 600 may utilize a database of available jobs. The career interest response 160 may comprise of every career and/or the most relevant careers identified by the career evaluation engine 600. The most relevant careers may be identified using a machine learning model and a set of features, described in more detail below.

Figure 2:
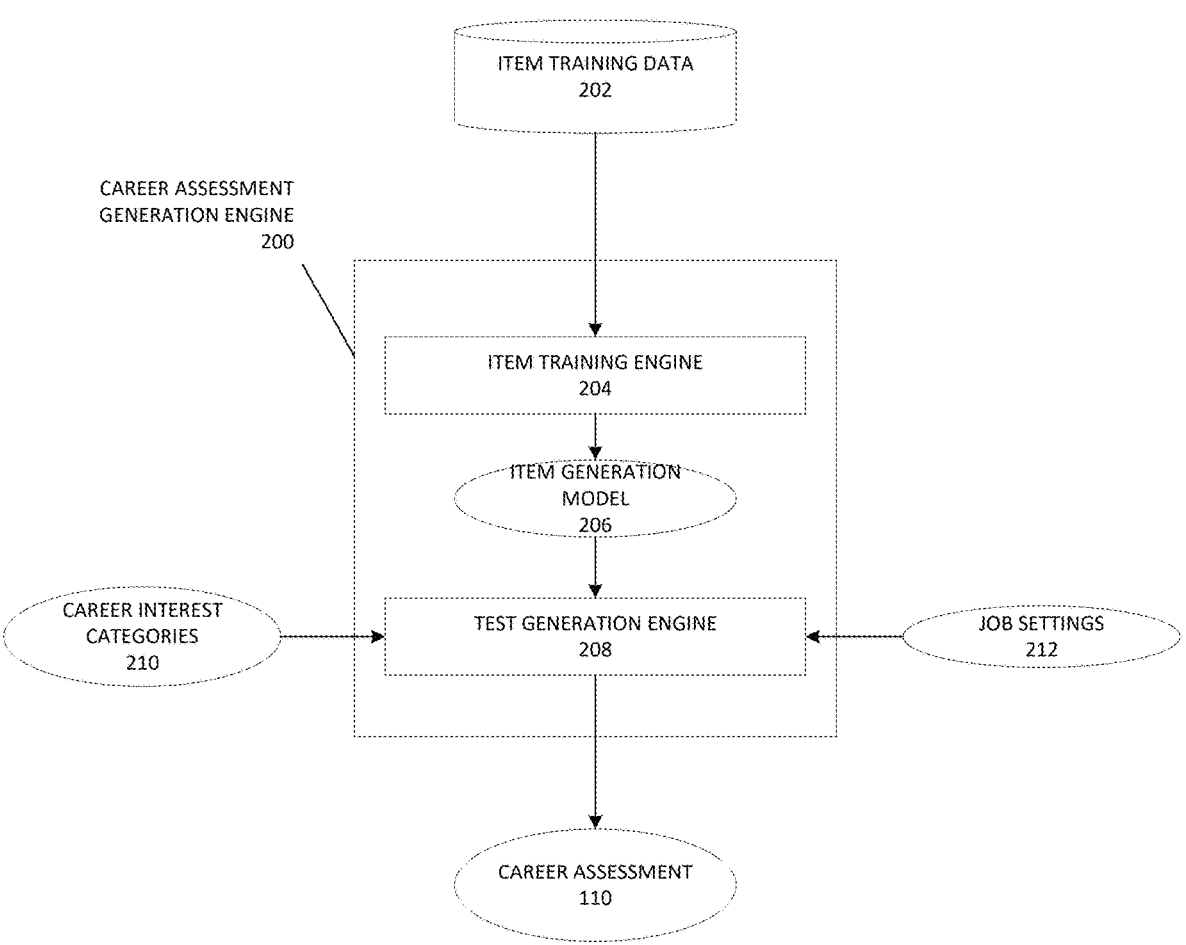
FIG. 2 is a diagram depicting example details of an career assessment generation engine.

FIG. 2 is a diagram depicting a detailed embodiment of a career assessment generation engine 200. An item training engine 204 receives item training data 202. The training data 202 may comprise of a plurality of training sets, where each training set includes an occupation and/or job setting, a career interest, and an answer item based on the occupation and/or job setting and career interest. The item training engine 204 trains an item generation model 206 to generate an answer item based on an occupation and/or job setting and career interest category. The item generation model 206 may be a machine-learning based language model. For example, in accordance with some embodiments, the item generation model 206 may receive hospital as a job setting (i.e., healthcare industry). The item generation model 206 may generate the following answer item "record patients' medical information and vital signs," a job task associated with nursing.

A test generation engine 208 may receive the item generation model 206, career interest categories 210, and job settings 212. The career interest categories 210 may be a list of career interests based on a categorization of career interest. For example, in accordance with some embodiments, one example categorization is the RIASEC model. In this embodiment, the list of career interests would be realistic, investigative, artistic, social, enterprising, and conventional. The job settings 212 may be a list of job settings that the test generation engine 208 should generate test questions for. Example job settings include sports reality show, medical research facility, shopping mall, web mapping platform, architecture/engineering school, solar farm, or state park.

The test generation engine 208 generates the career assessment 110. In some embodiments, the test generation engine 208 may use the item generation model to generate answer items for each category in the career interest categories 210. The answer items for each career interest category are compiled into a question. The test generation engine 208 generates a question for each job in the job settings 212. The career assessment 110 may be administered to various job seekers. Alternatively and/or additionally, the career assessment 110 may be customized backed on the job seekers experience, education and/or interests. For example, in some embodiments, a job seeker may input their experience, education, and/or interests and the career assessment generation engine 200 may generate a customized career assessment 110. As another example, in some embodiments, a test administer may input specific criteria, such as experience, education, and/or interests or specific job settings 212, and career assessment generation engine 200 may generate a customized career assessment for a specific group of job seekers.

Figure 3:
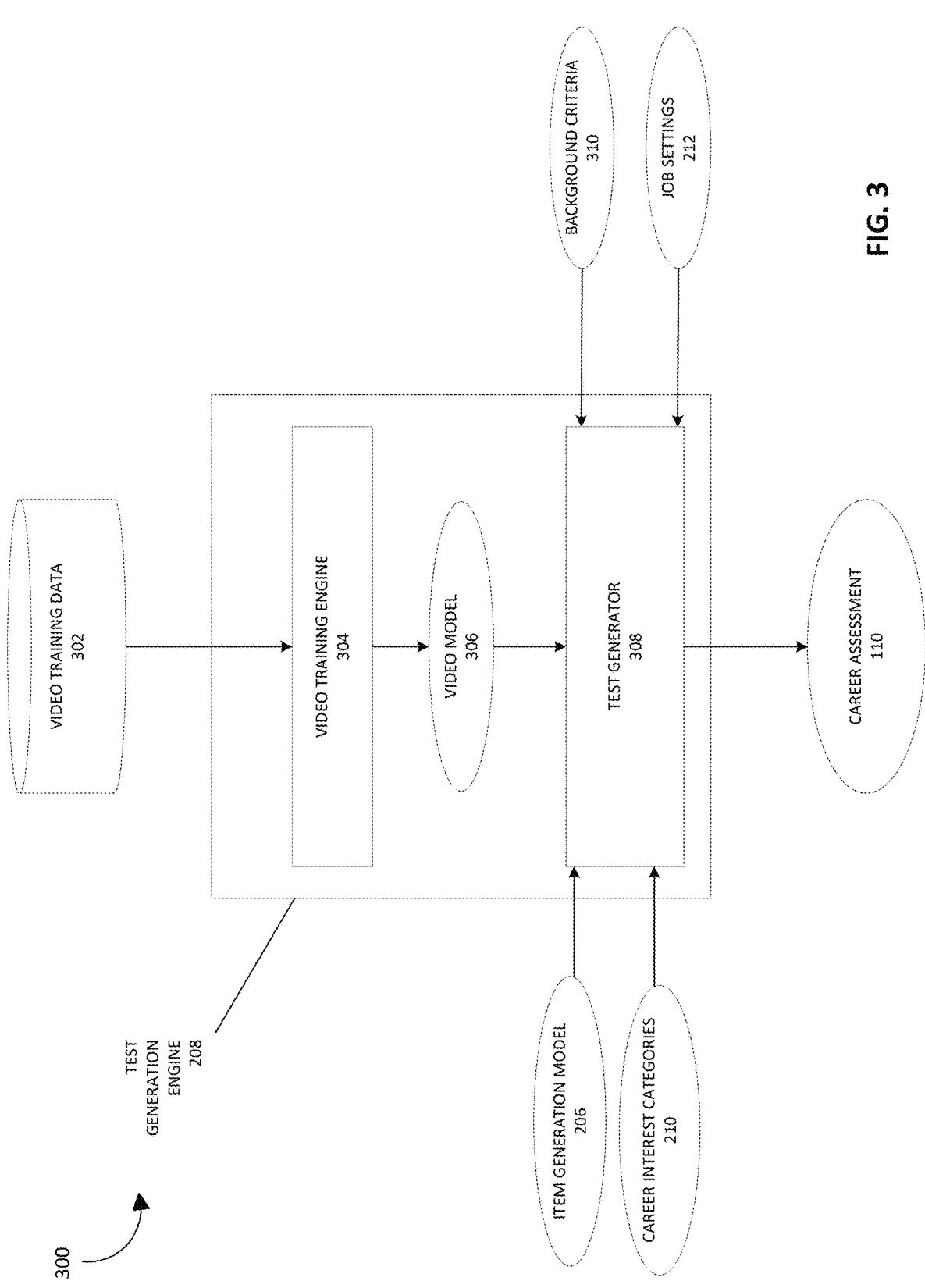
FIG. 3 is a diagram depicting example details of a test generation engine.

FIG. 3 is a diagram depicting a detailed embodiment 300 of the test generation engine 208 that includes a video aspect. In this embodiment, the test generation engine 208 uses machine learning techniques to generate videos for each question. The use of a generative video model may allow for the generation of realistic video sequences with greater efficiency. Using video-based questions may allow for stronger criterion-related validity, increase face validity and increase accessibility. Further, it may also allow job seekers to "see themselves" in new careers or industries.

The video training engine 304 receives video training data 302 and generates a video model 306. The video training data 302 may include a diverse video dataset, representing types of videos that the video model 306 should be trained to generate. For example, the video training data would include a variety job setting related videos with prompts for different career interests. The video training engine 304 may pre-process and clean the video training data 302 to eliminate any irrelevant or noisy videos, to ensure data quality and relevance. The training data 302 may be split into a specific training set and validation sets to evaluate the model. The video training engine 304 may use a generative model architecture for video generations. Examples include variational autoencoders (VAEs), generative adversarial networks (GANs), recurrent neural networks (RNNs), and conditional generative models. VAEs are generative models that learn a latent representation of videos and can generate new video sequences by sampling from the learned latent space. GANs are models that comprise a generator and a discriminator that compete against each other to generate realistic videos. RNNs are models that capture temporal dependencies in videos and generate sequences based on learned patterns. Conditional generative models are models that generate videos conditioned on specific attributes or input information.

The video training engine 304 trains the video model 306 by using the specific training set of training data 302 and a generative video architecture as well as hyperparameters associated with the selected generative video architecture. In some embodiments, the training data 302 may use the validation sets of the training data 302 to evaluate the robustness and accuracy of the video model 306 and continue to fine tune the video model 306 to enhance its quality. Once the video training engine 304 is satisfied with the video model 304 performance, it may deploy the video model 306 for use by the test generation engine 208. The video model 306 may be a machine learning based generative video model that takes in inputs, such as a job setting and associated answer items and background criteria. Background criteria may include user characteristics. For example, in some embodiments, a user may specify physical traits, such as hair color, hair style, and eye colors. In some embodiments, the video model 306 may generate an avatar based on the background criteria. Then, the video model 306 may generate a video based on the job setting, answer items, and background criteria. For example, in some embodiments, the video model 306 may receive hospital as the job setting and the following answer items: (1) "record patient's medical information and vital signs" (nurse, conventional), (2) "interpret the outcome of diagnostic imaging procedures including magnetic resonance imaging, computer tomography or positron emission tomography" (radiologist, investigative) and (3) "assess client needs or disorders, using drawing, painting, sculpting or other artistic process" (art therapist, artistic). The video model 306 may also receive background criteria, such as the following example user characteristics: hair color=brown, hair style=long, and eye color=green. The video model may then generate a video for an example question that features a hospital setting and shows an avatar with traits based on the background criteria. The generated video may have the avatar in scenarios based on the answer items.

Referring again to FIG. 3, a test generator 308 receives the video model 306, the item generation model 206, the career interest categories 210, background criteria 310, and job settings 212. For each job setting in job settings 212, the test generator 308 may generate an answer item for each career interest category in the career interest categories 210. The answer items are compiled into a question. Once the test generator 308 has generated a question for each job setting in the job settings 212, it may generate a video for each question using the video model 306 based on the answer items for the particular question, as well as the job setting associated with that question. In some embodiments, the test generator 308 may personalize the avatar in the video based on the background criteria 310. The test generator 308 may update each question by adding the video, such that the updated question includes a video, answer items, and a job setting. The test generator 308 may compile the updated questions to generate the career assessment 110.

Figure 4:
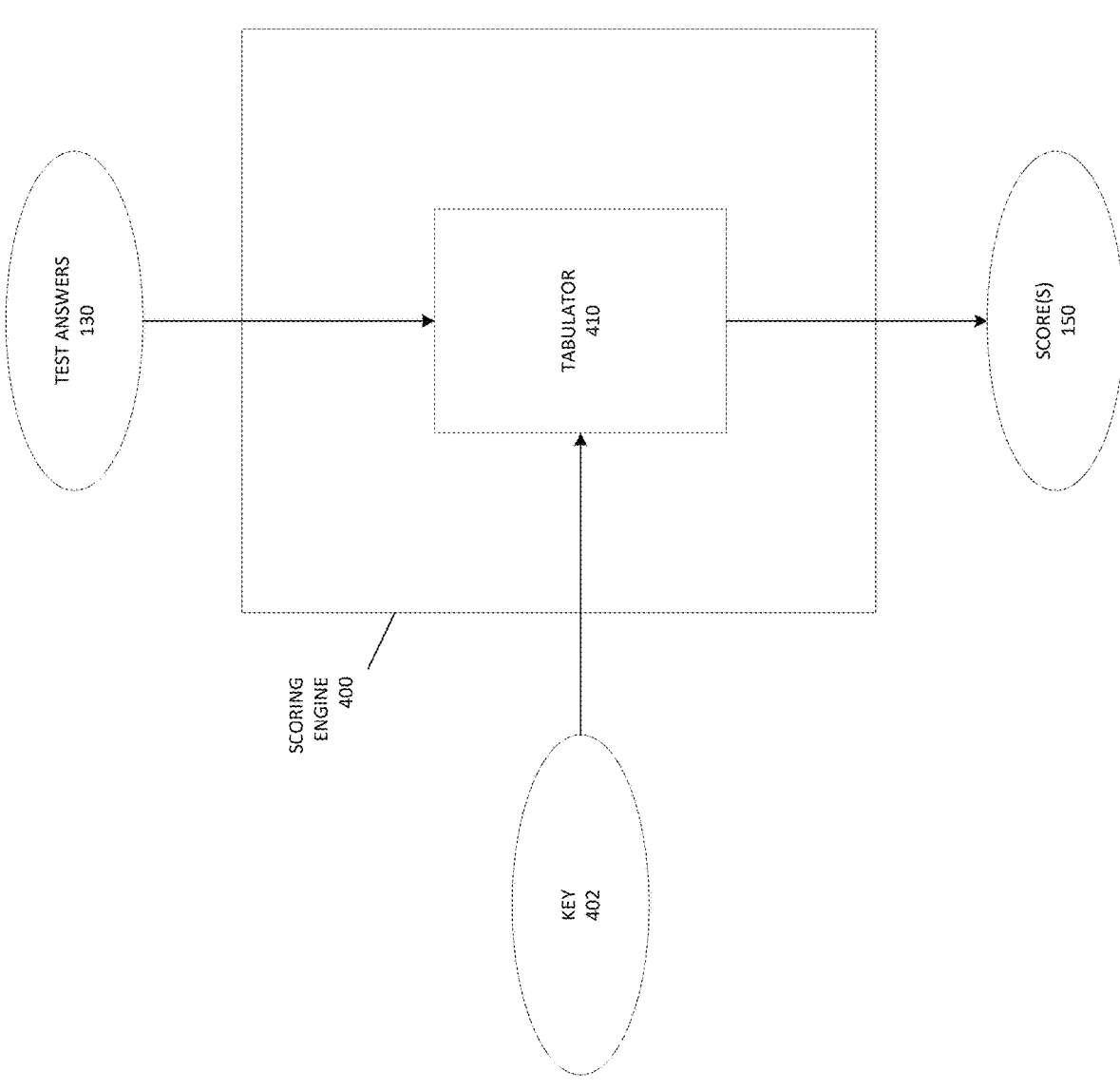
FIG. 4 is a diagram depicting example details of a scoring engine.

FIG. 4 is a diagram depicting a detailed embodiment of the scoring engine 400. A tabulator 410 receives the test answers 150 and a key 402. The key 402 may help analyze the test answers 150 and provide a method of scoring the test answers. For example, in some embodiments, the key 402 may state that for test answers 130 that include the most relevant answer item and least relevant answer item (most/least response method) to provide a +1 score for the career interest category related to the most relevant answer item, a −1 score for the career interest category related to the least relevant answer item, and a 0 score for the rest of the career interest categories. As another example, in some embodiments, the key 402 may state that for a test answer 130 that ranks the answer items from most relevant to least relevant (ranking response method), a 0-5 score range should be used. In this example, for test answers 150 for one question in a career assessment and six answer items, the career interest category associated with the most relevant answer item may receive a score of 5 for that question and career interest category associated with the next most relevant answer item may receive a score of 4. The scoring may continue in descending order until the career interest category associated with the least relevant answer item receives a score of 0.

As yet another example, FIG. 5 depicts an example key 500, in accordance with some embodiments, for a question in a career interest assessment. There are six answer items, listed A-F for this question, as shown in the key 500, and the RIASEC model is used to categorize the career interest categories. In this example, rather than associating an answer item with only one career interest category, the engine associates each with all relevant career interest categories. In embodiments that include test answers 150 that use the most/least response method, the engine may use a key 500 and provide a positive score for the career interest categories associated with the most relevant answer item and a negative score for the career interest categories associated with the least relevant answer item. In other embodiments where the ranking response method is used, the key 500 for a question may use a multiplier x5 for the career interest categories associated with the most relevant score and the multiplier may decrease in increments of one for each answer item based on relevance. The least relevant score may have a x0 multiplier.

Referring back to FIG. 4, the tabulator 410 uses the test answers 130 and key 402 to score test answers for each question in the career assessment. The tabulator 410 may then add the scores for each career interest category from the test answers 130 and generate score(s) 150. Score(s) 150 may include the total score for each career interest category. For example, in some embodiments the score(s) 150 may include both positive and negative values, where the career interest category with the highest value may be the career interest category the user is most interested in, and the career interest category with the lowest value may be the career interest category the user is least interested in. In some embodiments, the score(s) 150 may be relevance values that evaluate how closely related the test answer is to a career interest category.

Figure 6:
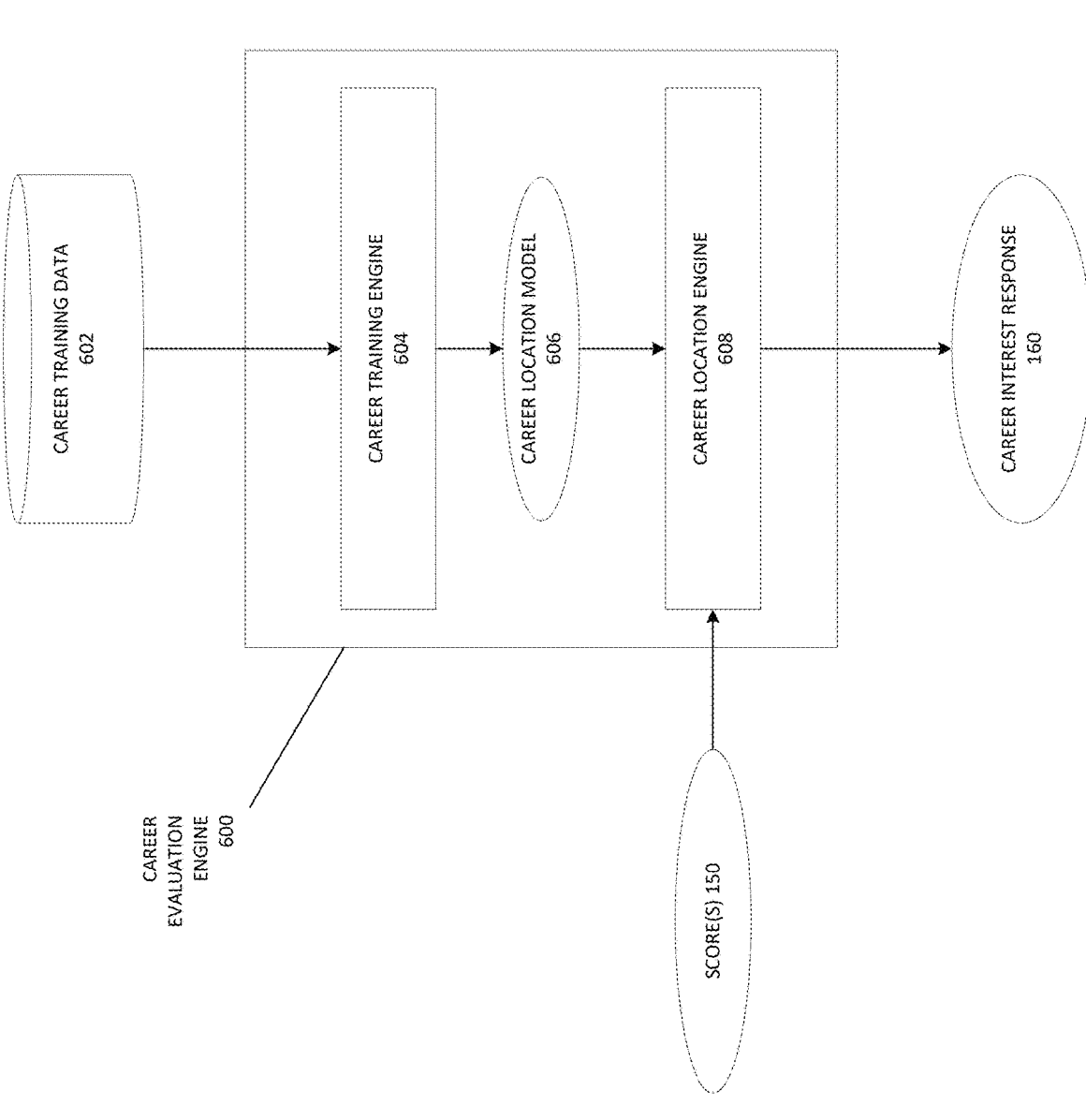
FIG. 6 is a diagram depicting example details of a career evaluation engine.

FIG. 6 is a diagram depicting a detailed embodiment of a career evaluation engine 600. A career training engine 604 receives career training data 602. The training data 602 may include careers including their job tasks with an indication of which career interest categories are relevant to that career and/or individual job tasks. The career training engine 604 may generate a machine learning based career location model 606 that can identify a career related to a specific career interest category. In some embodiments, the career location model 606 may use more than one career interest category to identify relevant careers. Alternatively and/or additionally, in some embodiments, the career model 606 may identify one or more careers. A career location engine 608 may receive the career location model 606 and the score(s) 150. The career location engine 608 may include and/or have access to a career database. The career database may be customizable based on the needs of a particular group of job seekers. For example, in some embodiments, a career database may be a database of every career that exists. In other embodiments, the career database may be a database of all available job listings. In further embodiments, the career database may be based on a specific online database such as O*NET, a site that provides broad access to occupational information developed by the U.S. Department of Labor. The career location engine 608 may use the score(s) 150 and the career location model 606 to identify careers in the career database that are most relevant based on the scores(s) 150. These careers and additional information regarding relevant career interest categories may be generated as a career interest response 160. The career interest response 160 may include relevant jobs that the user may be interested in based on their test answer. In some embodiments, the career interest response 160 may also include additional information on the career interest categories that the system identified as most interesting to the user. Additionally and/or alternatively, the career interest response 160 may provide a list of available job listings based on the relevant career interest categories. In some instances, the career interest response 160 may further base the list of available jobs on the user's experience, education, and/or location. Moreover, in some embodiments, the career interest response 160 may provide direct links to apply to these jobs and/or other resources related to the job listings.

FIG. 7 is a flow diagram depicting an example method 700 of evaluating career interests through situational judgment test format. At 702, the system generates a career assessment, using a first language based machine learning model and a set of criteria. For example, in some embodiments, a career assessment generation engine 200 may use an item generation model 206, a first language based machine learning model, career interest categories 210, such as the RIASEC model, and job settings 212. In this embodiment, the career interest assessment generated may include a question for each job setting in job settings 212.

At 704, the system administers the career assessment to a user. For example, in some embodiments, a user device 120 may administer the career assessment 110 to the user. The user may respond to each question in the career assessment. At 706, the system may receive a plurality of test answers for the user based on the career assessment. For example, in some embodiments, the user may select the most relevant answer item and least relevant answer item for each question, while in other embodiments, the user may rank the answer items from most relevant to least relevant. In further embodiments, the user may use a different answering technique. These responses to each question in the career assessment may make up the plurality of test answers for the user.

At 708, the system for a particular test answer may assign a score for the particular test answer and determine at least one user career interest category based on the score. For example, in some embodiments, the scoring engine 400 may receive the plurality of test answers 130 and assign a score for the test answer. The scoring engine 400 may determine at least one user career interest category based on the score. At 710, the system tabulates totals for the at least one user career interest category based on said determination. For example, in some embodiments, the score engine 400 may tabulate totals for all the scores for the career interest categories into the score(s) 150.

At 712, the system provides at least one career suggestion, using a second language based machine learning model, based on the totals for the at least one user career interest category. For example, in some embodiments, the career location engine 608 may receive the score(s) 150 and the career location model 606 will generate at least one career suggestion, such as a career interest response 160.

Figure 8:
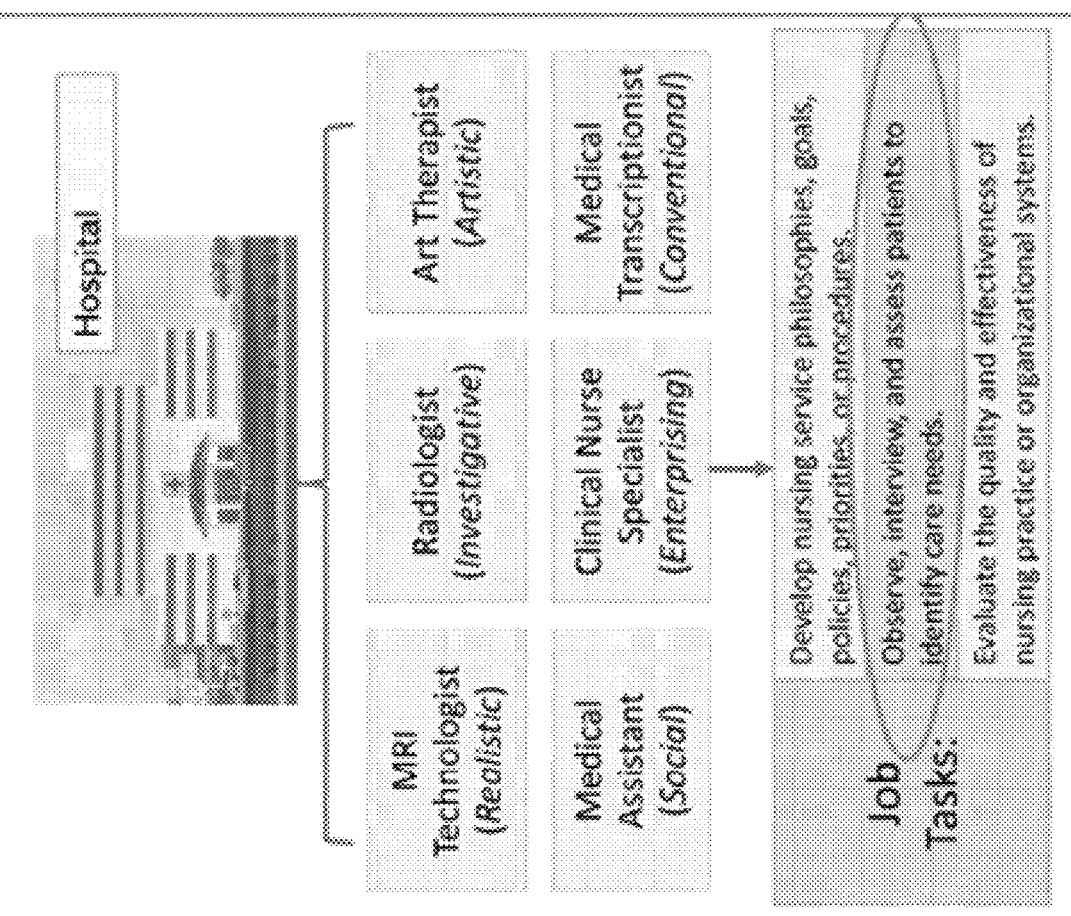
FIG. 8 is a diagram depicting an example job setting, careers and job tasks.

FIG. 8 provides example job settings, job tasks, and careers available in a hospital for each career interest category in the RIASEC model. An example system for evaluating career interest assessments may receive a hospital as a job setting and generate a question where it uses answer items based on each career for a specific career interest category. For example, an answer item to demonstrate enterprising may be "observe, interview and assess patients to identify care needs." If the user's overall most relevant career interest category was enterprising, the system may provide a career suggestion for clinical nurse specialist.

FIGS. 9-15 depict results for an example implementation of the scoring engine 400 in accordance with some embodiments. Two hundred job seekers took an example career interest assessment in two instances. The second instance was at least one month after the first instance. In addition to the career interest assessment, the job seekers completed the O*NET Interest Profiler Short Form (OIP-SF) to examine the career interest assessment's validity. For each of the six RIASEC categories, the OIP-SF presents ten representative activities (e.g., sing in a band, manage a retail store, assemble electronic parts), with individuals required to rate their level of enjoyment for each activity. A five-point Likert scale response format (1=strongly dislike, 5=strongly like) was used.

Figure 9:
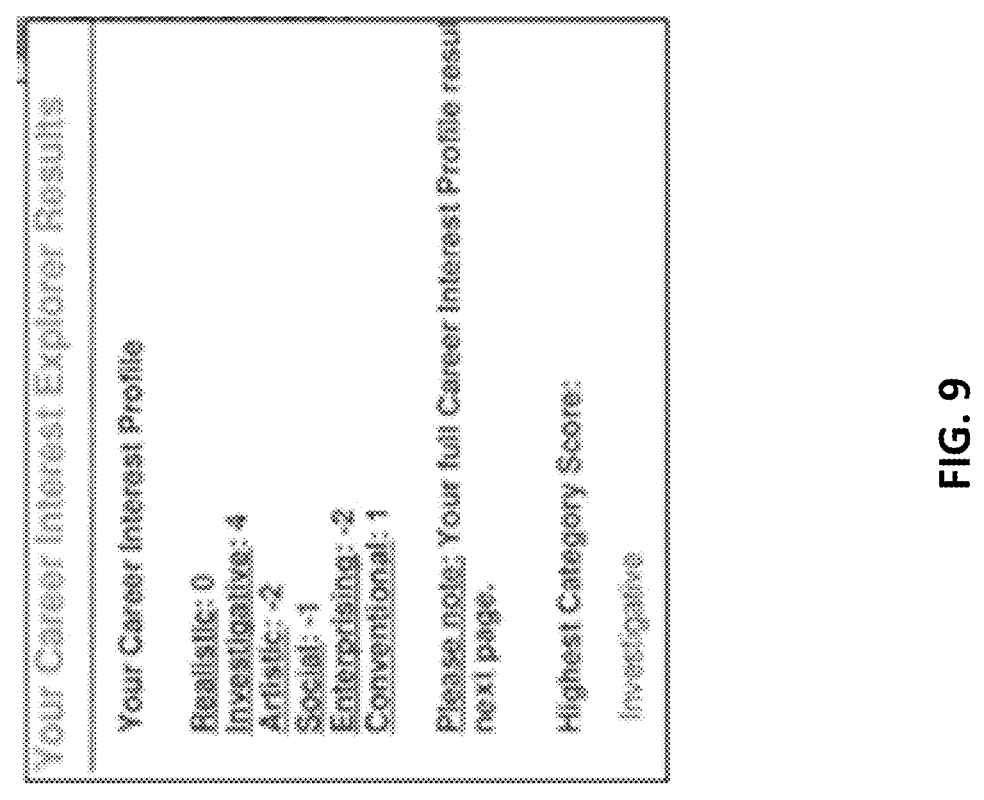

After each instance, job seekers received a pdf report of their career interest scores, as shown in FIGS. 9-10, which included a list of occupations that matched their RIASEC high point, using information from O*NET. Specifically, job seekers received a list of occupations with a RIASEC high point that matched their highest score, ranking in descending order based on projected job growth over the next ten years (i.e., most in-demand occupations) as estimated by O*NET. For each of these occupations, the report hyperlinked to its respective page on the O*NET website for more information, including typical salary, common educational requirements, and representative job tasks. The report may also allow users to view occupations for any of the other RIA- SEC categories, again using relevant hyperlinks to the O*NET website. One advantage of such a feature may be its ability to facilitate career exploration for individuals with multiple RIASEC high points.

Job seekers were then asked to respond to a survey that included both quantitative and qualitive items, assessing areas such as the career interest assessment's general value, relevant to their job search and user experience. The survey for the first instance focused on participants' immediate reaction the career interest assessment, whereas the survey for the second instance evaluated job seekers' perceptions of the career interest assessment's value in their job search efforts over the past month (i.e., since the first instance).

Prior to analyses, the data files for each instance were examined for response quality, specifically pattern responding and random responding. The career interest assessments were scored such that, for each answer item, respondents received a score of +1 for each task they stated they would enjoy the most, a score of –1 for each task they stated they would enjoy least, and a score of zero for the remaining tasks. Job seekers received "high point" and "low point" categories based on their highest and lowest scores. FIG. 12 shows a table depicting the high points and low point scores for each instance (e.g., Wave 1=first instance and Wave 2=second instance). General trends were consistent across the two instances, and the most common high scores were Artistic followed by Conventional. The most common low score was Social.

Figures 12A, 12B:
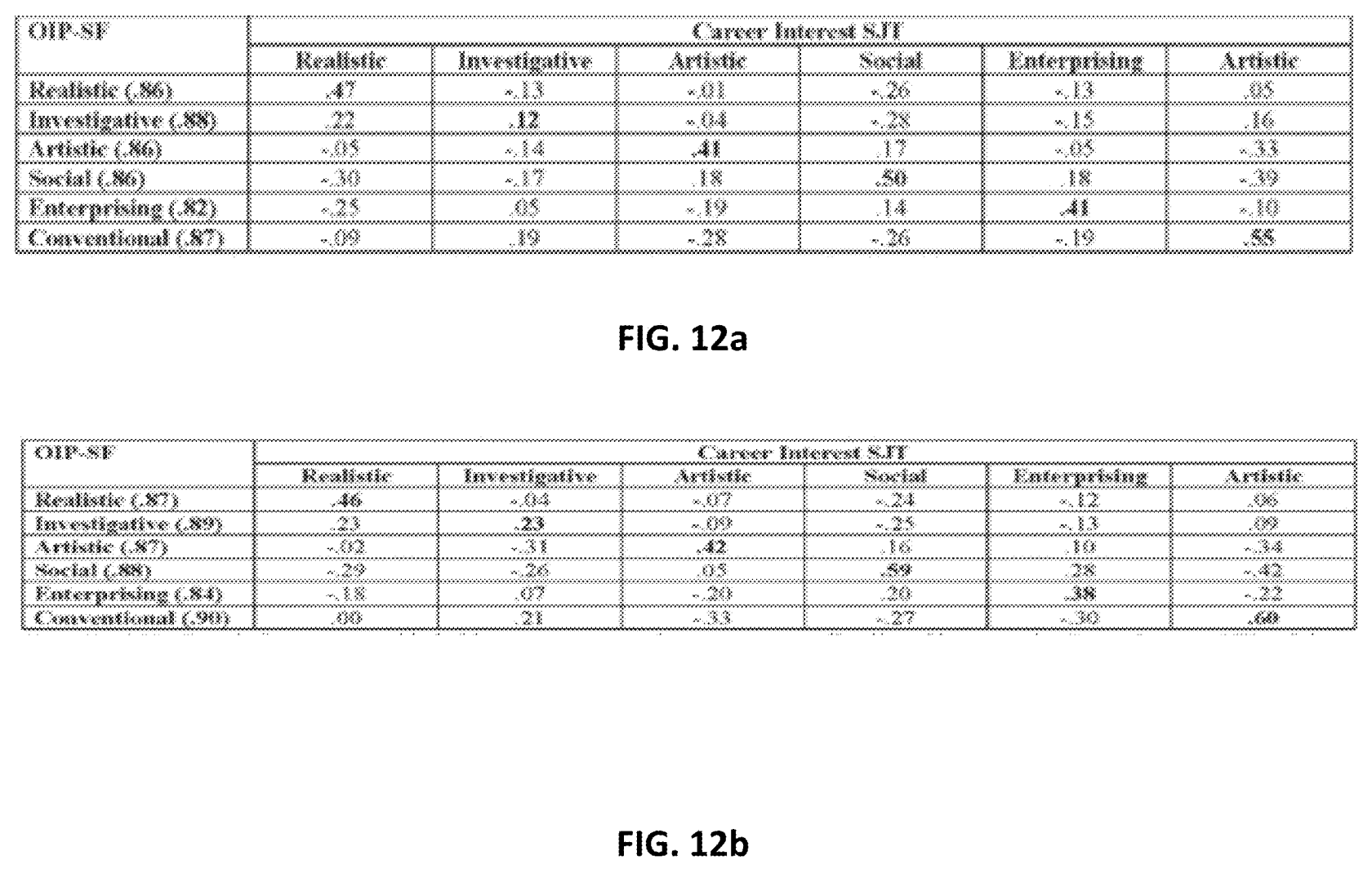

Two analyses were conducted to examine the validity for the career interest assessment. First, each of the six interest scores were correlated with their respective counterparts on the OIP-SF, as shown in FIG. 12a-b. FIG. 12a is a table depicting the corrections between the career interest assessment and the OIF-SF in the first instance (Wave 1). FIG. 12b is a table depicting the correlation between the career interest assessment and the OIP-SF in the second instance (Wave 2). For each of the scores, these correlations were generally in the 0.4 range or higher in the expected direction, except for the Investigative score, which generated a correlation of 0.12 (first instance) and 0.23 (second instance). Almost every RIASEC score correlated most highly in the expected direction with its OIP-SF counterpart in each instance.

Second, the high-point and low-point agreement between the career interest assessment and OIP-SF were evaluated, as shown in FIG. 13a-b. Across both instances (Wave 1 and Wave 2), for the high-point and low-point, the career assessment results and OIP-SF results tended to disagree more often than they agreed. That is, individuals high-points (or low-points) were more likely to differ between the career assessment and OIP-SF than they were to overlap. However, this does not necessarily mean that the career interest assessment is not as effective, but rather that using situational judgment testing may provide different, potentially more effective results than the Likert Scale in the OIP-SF test.

The reliability of the career interest assessment one-month test-retest was evaluated. FIG. 14 depicts the correlation of the six RIASEC interest scores between the first and second instance. The reliability correlation was between 0.60-0.83 for the career interest assessment while they were between 0.18 to 0.5 for the OIP-SF. FIG. 15a is a table depicting correlations between the first instance (Wave 1) high-points and the second instance (Wave 2) high-points. For each of the six RIASEC categories, participants' high-point at the first instance was most commonly associated with the same high-point at the second instance. FIG. 15b is a table depicting correlations between the first instance (Wave 1) low-points and the second instance (Wave 2) low-points. Results were less consistent for low-point agreement across the two instances, but the sample sizes for some categories without expected agreement were small.

The methods and systems described herein may be implemented using any suitable processing system with any suitable combination of hardware, software, and/or firmware, such as described below with reference to the non-limiting examples of FIGS. 16A, 16B, and 16C.

Figure 16A:
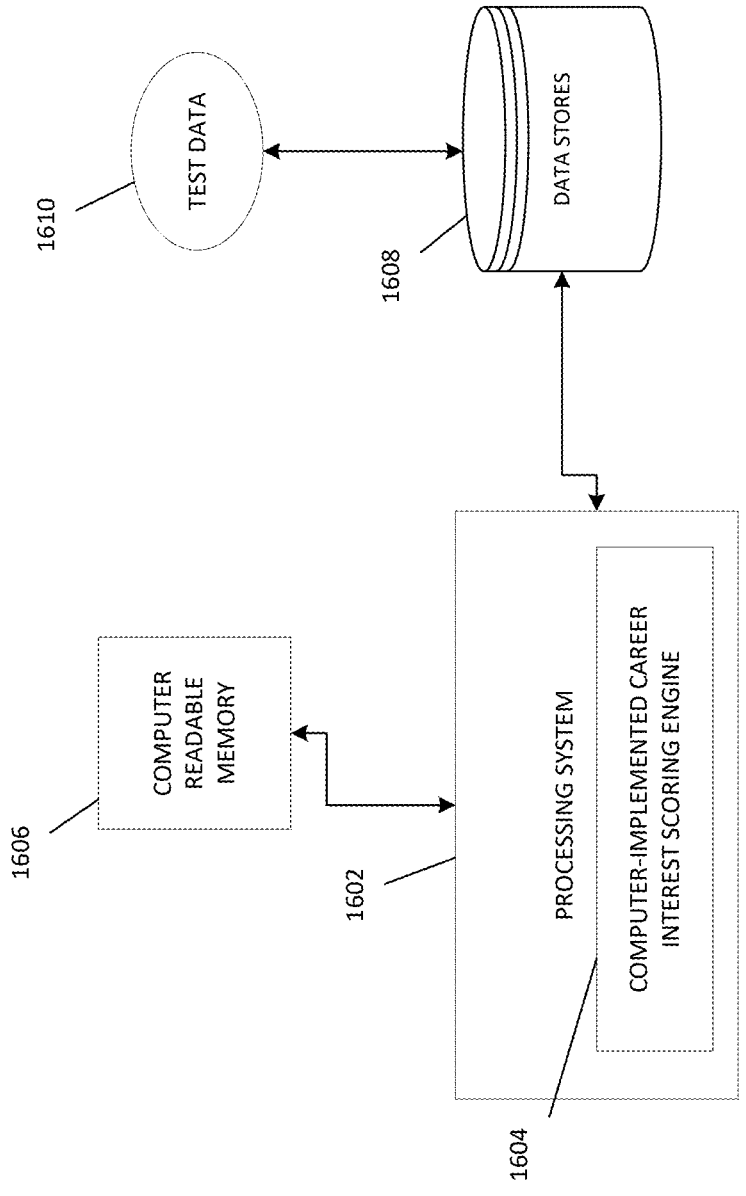
FIGS. 16A, 16B, and 16C are flow diagrams depicting example systems for implementing the approaches described herein for modeling lexical experience for tracking oral reading fluency.
Figure 16B:
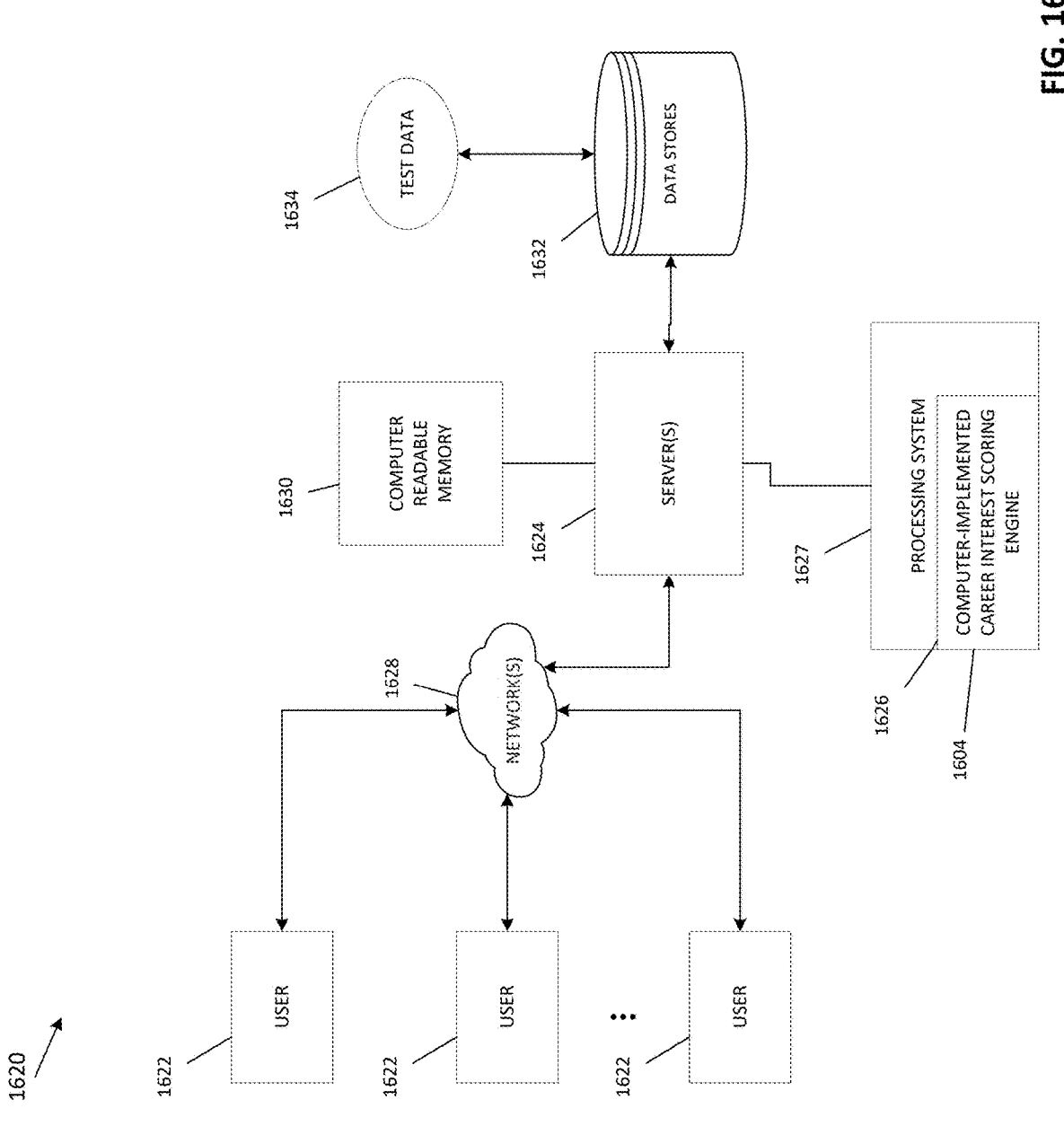
Figure 16C:
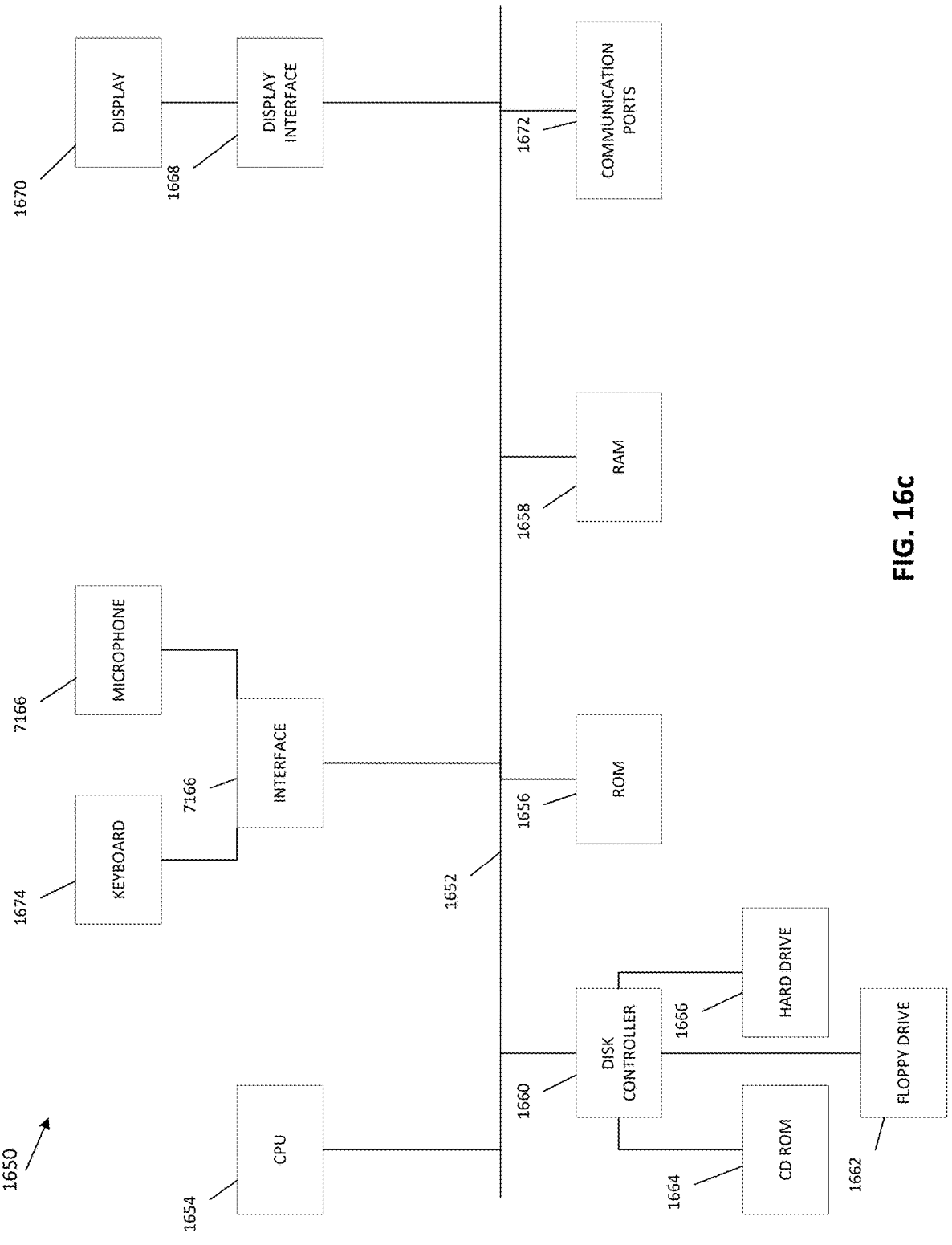

FIGS. 16A, 16B, and 16C depicts example systems for use in implementing a system. For example, FIG. 16A depicts an exemplar system 1600 that includes standalone computer architecture where a processing system 1602 (e.g., one or more computer processors) includes a computer-implemented phoneme mispronunciation analyzer engine 1604 being executed on it. The processing system 1602 has access to a non-transitory computer-readable memory 1606 in addition to one or more data stores 1608. The one or more data stores 1608 may contain text data 1610.

FIG. 16B depicts a system 1620 that includes client server architecture. One or more user PCs 1622 access one or more servers 1624 running a system 1626 on a processing system 1627 via one or more networks 1628. The one or more servers 1624 may access a non-transitory computer-readable memory 1630 as well as one or more data stores 1632. The one or more data stores 1632 may contain script data 1634 as well as audio data 1636.

FIG. 16C shows a block diagram of exemplary hardware for a standalone computer architecture 1650, such as the architecture depicted in FIG. 16A, that may be used to contain and/or implement the program instructions of system embodiments of the systems and methods herein. A bus 1652 may serve as the information highway interconnecting the other illustrated components of the hardware. A processing system 1654 labeled CPU (central processing unit) (e.g., one or more computer processors) may perform calculations and logic operations required to execute a program. A non-transitory computer-readable storage medium, such as read-only memory (ROM) 1656 and random access memory (RAM) 1658, may be in communication with the processing system 1654 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal or a modulated carrier wave, e.g., such that the instructions may then be stored on a non-transitory computer-readable storage medium.

A disk controller 1660 interfaces one or more optional disk drives to the system bus 1652. These disk drives may be external or internal floppy drives such as 1662, external or internal CD-ROM, CD-R, CD-RW, or DVD drives such as 1664, or external or internal hard drives 1666. As indicated previously, these various disk drives and disk controllers are optional devices.

Each of the element managers, real time data buffer, conveyors, file input processors, database index shared access memory loaders, reference data buffers, and data managers may include a software application stored in one or more of the disk drives connected to the disk controller 1660, the ROM 1656, and/or the RAM 1658. Preferably, the process 1654 may access each component as required.

A display interface 1668 may permit information from the bus 1656 to be displayed on a display 1670 in audio, graphic, or alphanumeric format. Communication with external devices may optionally occur using various communication ports 1672.

In addition to the standard computer-type components, the hardware may also include data input devices, such as a keyboard 1674, or other input devices 1676, such as a microphone, remote control, pointer, mouse, and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores, and data structures described herein may be connected directly or indirectly to each other in order to allow the flow of data needed for their operations. It is also noted that a module or processor includes, but is not limited to, a unit of code that performs a software operation, and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The foregoing outlines features several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

13

14

The invention claimed is:

1. A computer-implemented method comprising:

training a first language based machine learning model with a plurality of training sets to receive a job setting and a career interest category and generate a job task, wherein each training set comprises an example job task corresponding to an example job setting and an example career interest category;

using the first language based machine learning model, a list of career interest categories, and a list of job settings to generate a career assessment comprising a plurality of questions, each question comprising a job setting and a plurality of answer items;

administering the career assessment to a user;

receiving a plurality of test answers for the user based on the career assessment;

for a particular test answer:

assigning a score for the particular test answer; and determining at least one user career interest category based on the score;

tabulating totals for the at least one user career interest category based on the said determining; and providing at least one career suggestion, using a second language based machine learning model, based on the totals for the at least one user career interest category.

2. The method of claim 1, wherein each question is in a situational judgment test format and the corresponding answer items are job tasks performable at the corresponding job setting.

3. The method of claim 1, further comprising:

receiving the list of career interest categories;

identifying the list of job settings;

identifying answer items for each job setting in the list of job settings based at least on a first career interest category; and compiling the answer items for each career interest category in the list of career interest categories for a first job setting in the list of job settings to generate a first question of the plurality of questions.

4. The method of claim 1, further comprising:

training the second language based machine learning model that provides the at least one career suggestion to identify a first career based at least on a first career interest category;

receiving a third second career interest category; and identifying a second career, using the second language based machine learning model and the second career interest category, wherein the at least one career suggestion includes the second career.

5. The method of claim 1, wherein the career assessment is customized for the user by considering a set of criteria comprising work experience, education level, age, and/or location.

6. The method of claim 1, wherein the second language based machine learning model is trained on career training data, which comprises a plurality of careers and, for each career, a plurality of job tasks and a plurality of relevant career interest categories.

7. The method of claim 1, wherein the particular test answer corresponds to more than one relevant career interest category.

8. The method of claim 1, wherein the score comprises a relevance value for at least one career interest category, wherein the relevance value evaluates how closely related the test answer is to the at least one career interest category.

9. The method of claim 1, further comprising comparing the totals for the at least one career interest category to totals for the same career interest category from an alternate career assessment administered to the user.

10. The method of claim 9, further comprising retesting the user on the generated career assessment and the alternate career assessment; and comparing the totals from the first round of testing to the totals for the second round of testing to analyze a consistency of results of the career assessments.

11. The method of claim 1, further comprising:

receiving a key, the key comprising directions for how to assign the score for the particular test answer.

12. The method of claim 11, wherein a scoring engine receives the plurality of test answers and the key and assigns the score for the particular test answer, wherein the scoring engine is configured to generate a matrix form data structure that interrelates potential answer items for the particular answer to the list of career interest categories, wherein each potential answer item-career interest category pair receives a value in the matrix form data structure to be applied to the tabulation of the total for that career interest category if the user chooses that potential answer item, and wherein the value in the matrix form data structure for each potential answer item-career interest category pair is based on whether that particular answer item recites a job task that corresponds to that particular career interest category.

13. The method of claim 11, wherein assigning a score for the particular test answer comprises:

using the key to create a matrix of potential scores for each career interest category for each of the plurality of answer items, wherein the one or more career interest categories that correspond to the particular test answer receive a positive potential score.

14. The method of claim 1, wherein the career assessment comprises at least one video aspect.

15. The method of claim 14, further comprising:

generating the at least one video aspect using a third language based machine learning model and user background criteria, wherein the user background criteria comprise physical characteristics of the user.

16. The method of claim 15, wherein the at least one video aspect includes an avatar generated based on the physical characteristics of the user.

17. The method of claim 15, wherein the third language based machine learning model is trained to generate a first video aspect using a first set of background criteria, a second job setting, and a list of answer items.

18. The method of claim 15, wherein the third language based machine learning model is trained on a plurality of job setting related videos with prompts for different career interests.

19. The method of claim 15, wherein the third language based machine learning model generates a video aspect for each question of the plurality of questions based on the generated plurality of answer items and the corresponding job setting.

20. A system for evaluating career interest comprising:

a processing system comprising one or more data processors; and a computer-readable medium encoded with instructions for commanding the processing system to execute steps comprising:

training a first language based machine learning model with a plurality of training sets to receive a job setting and a career interest category and generate a job task, wherein each training set comprises an example job task corresponding to an example job setting and an example career interest category;

using the first language based machine learning model, a list of career interest categories, and a list of job settings to generate a career assessment comprising a plurality of questions, each question comprising a job setting and a plurality of answer items;

administering the career assessment to a user;

receiving a plurality of test answers for the user based on the career assessment;

for a particular test answer:

assigning a score for the particular test answer; and determining at least one user career interest category based on the score;

tabulating totals for the at least one user career interest category based on the said determining; and providing at least one career suggestion, using a second language based machine learning model, based on the totals for the at least one user career interest category.

21. The system of claim 20, wherein each question is in a situational judgment test format and the corresponding answer items are job tasks performable at the corresponding job setting.

22. The system of claim 20, the steps further comprising:

receiving the list of career interest categories;

identifying the list of job settings;

identifying answer items for each job setting in the list of job settings based at least on a first career interest category; and compiling the answer items for each career interest category in the list of career interest categories for a first job setting in the list of job settings to generate a first question of the plurality of questions.

23. The system of claim 20, the steps further comprising:

training the second language based machine learning model that provides the at least one career suggestion to identify a first career based at least on a first career interest category;

receiving a second career interest category; and identifying a second career, using the second language based machine learning model and the second career interest category, wherein the at least one career suggestion includes the second career.

24. The system of claim 20, wherein the score comprises a relevance value for at least one career interest category, wherein the relevance value evaluates how closely related the test answer is to the at least one career interest category.

25. A non-transitory computer-readable medium encoded with instructions for commanding one or more data processors to execute steps of a method comprising:

training a first language based machine learning model with a plurality of training sets to receive a job setting and a career interest category and generate a job task, wherein each training set comprises an example job task corresponding to an example job setting and an example career interest category;

using the first language based machine learning model, a list of career interest categories, and a list of job settings to generate a career assessment comprising a plurality of questions, each question comprising a job setting and a plurality of answer items;

administering the career assessment to a user;

receiving a plurality of test answers for the user based on the career assessment;

for a particular test answer:

assigning a score for the particular test answer; and determining at least one user career interest category based on the score;

tabulating totals for the at least one user career interest category based on the said determining; and providing at least one career suggestion, using a second language based machine learning model, based on the totals for the at least one user career interest category.

* * * * *